(12) United States Patent
Hunt

(10) Patent No.: US 12,721,354 B2
(45) Date of Patent: Sep. 1, 2026

(54) MACERATOR DESIGN FOR PORTIONED CHICKEN BREAST FOR FAST FOOD RESTAURANTS

(71) Applicant: JBT Marel Corporation, Chicago, IL (US)

(72) Inventor: Dale R. Hunt, Valparaiso, FL (US)

(73) Assignee: JBT Marel Corporation, Chicago, IL (US)

( * ) Notice: Subject to any disclaimer, the term of this patent is extended or adjusted under 35 U.S.C. 154(b) by 61 days.

(21) Appl. No.: 17/353,238

(22) Filed: Jun. 21, 2021

(65) Prior Publication Data

US 2022/0400692 A1 Dec. 22, 2022

(51) Int. Cl.

| | |
|---|---|
| ***A22C 21/00*** | (2006.01) |
| ***A22C 7/00*** | (2006.01) |
| ***A23L 5/10*** | (2016.01) |
| ***A23L 13/50*** | (2016.01) |

(52) U.S. Cl.

CPC .......... *A22C 21/003* (2013.01); *A22C 7/0023* (2013.01); *A22C 7/0092* (2013.01); *A23L 5/10* (2016.08); *A23L 13/55* (2016.08)

(58) Field of Classification Search

CPC ..... A22C 9/008; A22C 9/004; A22C 17/0013; A22C 21/003; A22C 7/0023; A22C 7/0092; A22C 17/0006; A22C 17/002; A22C 25/22; B02C 25/00; Y10S 100/91; A23L 13/77; A23V 2300/36; A23V 2300/34; A23V 2300/38; A23V 2300/31

See application file for complete search history.

(56) References Cited

U.S. PATENT DOCUMENTS

| | | | |
|---|---|---|---|
| 965,336 | A | 7/1910 | Schmidt |
| 2,228,644 | A | 1/1941 | Sackas |
| 3,019,722 | A | 2/1962 | Gum |
| 3,576,162 | A | 4/1971 | McBrady |
| 3,648,600 | A | 3/1972 | Jaccard |
| 3,753,398 | A | 8/1973 | Dohm |
| 4,072,763 | A | 2/1978 | Mart |

(Continued)

FOREIGN PATENT DOCUMENTS

| | | | |
|---|---|---|---|
| CN | 203544516 | U | 4/2014 |
| EP | 0044064 | B1 * | 10/1984 |

(Continued)

OTHER PUBLICATIONS https://www.youtube.com/watch?v=hJVaFZTzvxk; Meat&Poulrey Videos on Youtube posted Sep. 12, 2013 (Year: 2013).*

(Continued)

*Primary Examiner* — Joseph S Del Sole

(74) *Attorney, Agent, or Firm* — Christensen O'Connor Johnson Kindness PLLC

(57) ABSTRACT

A method for processing a protein-containing foodstuff portion to control the thickness. The method includes cutting a raw protein-containing foodstuff portion to make cuts on a surface of the raw protein-containing foodstuff portion, the raw protein-containing foodstuff portion has a first initial thickness; and after the raw protein-containing foodstuff portion is cut, pressing the raw protein-containing foodstuff portion, wherein after pressing a thickness of the raw protein-containing foodstuff portion is reduced from the initial thickness.

23 Claims, 6 Drawing Sheets

(56) References Cited

U.S. PATENT DOCUMENTS

| | | | | |
|---|---|---|---|---|
| 4,601,237 | A | 7/1986 | Harter | |
| 4,660,253 | A * | 4/1987 | LoBiondo | A22C 17/0093 452/142 |
| 5,381,725 | A | 1/1995 | Breunig | |
| 5,980,966 | A | 11/1999 | Handel | |
| 6,036,591 | A * | 3/2000 | Bonon | A22C 9/004 452/142 |
| 6,601,499 | B1 * | 8/2003 | Bifulco | A22C 17/0013 100/168 |
| 6,672,202 | B2 | 1/2004 | Thomas | |
| 7,140,958 | B2 | 11/2006 | Reutter | |
| 7,306,444 | B2 | 12/2007 | Heinzen | |
| 7,331,849 | B2 | 2/2008 | Bifulco | |
| 7,546,789 | B2 | 6/2009 | Reddell | |
| 7,578,732 | B2 | 8/2009 | Lennox, III | |
| 7,677,880 | B2 | 3/2010 | Moore | |
| 7,775,861 | B2 | 8/2010 | Sames | |
| 7,806,754 | B2 | 10/2010 | Stoughton | |
| 7,918,719 | B2 | 4/2011 | Parisini | |
| 8,764,523 | B2 * | 7/2014 | Ludwig | B02C 25/00 452/142 |
| 8,846,124 | B2 | 9/2014 | Heinzen | |
| 9,380,791 | B2 | 7/2016 | Borkiewicz | |
| 9,770,877 | B2 | 9/2017 | Sørensen | |
| 2003/0232103 | A1 | 12/2003 | Marino | |
| 2005/0124276 | A1 * | 6/2005 | Gagliardi | A22C 9/004 452/142 |
| 2006/0162518 | A1 | 7/2006 | Biggs | |
| 2006/0205335 | A1 * | 9/2006 | Bifulco | A22C 9/004 452/142 |
| 2008/0223228 | A1 | 9/2008 | Biggs | |
| 2012/0276827 | A1 * | 11/2012 | Borkiewicz | A22C 9/004 452/142 |
| 2017/0042166 | A1 * | 2/2017 | Ludwig | A22C 9/004 |
| 2017/0325470 | A1 | 11/2017 | Sørensen | |
| 2018/0078945 | A1 * | 3/2018 | Ludwig | B02C 25/00 |
| 2018/0235261 | A1 | 8/2018 | Cowherd | |
| 2018/0281220 | A1 | 10/2018 | Sørensen | |
| 2019/0084174 | A1 | 3/2019 | Wilson | |

FOREIGN PATENT DOCUMENTS

| | | | | |
|---|---|---|---|---|
| EP | 1174035 | B1 | 1/2002 | |
| EP | 1267629 | B1 | 1/2003 | |
| EP | 1582098 | B1 | 10/2005 | |
| EP | 1622456 | A2 | 2/2006 | |
| EP | 1797761 | B1 | 6/2007 | |
| EP | 1814395 | A2 | 8/2007 | |
| EP | 1845794 | B1 | 10/2007 | |
| EP | 2260714 | B1 | 12/2010 | |
| EP | 2332419 | A2 * | 6/2011 | A22C 21/003 |
| EP | 2698065 | A1 | 2/2014 | |
| EP | 2884846 | B1 | 6/2015 | |

OTHER PUBLICATIONS

EP0044064B1 ESpacenet Machine Translation (Year: 2023).*

Meat+Poultry—Wolftec, (Wolftec Polar Flex Carve Macerator, https://www.youtube.com/watch?v=hJVaFZTzvxk, Posted Sep. 12, 2013, Retrieved Jul. 10, 2023) (Year: 2023).*

"How Can a Macerator So Advanced Be So Easy to Use ?" Polar Flex Carvemacerator, Wolf-tec, Inc. Polar Technology, Kingston, US, May 1, 2019, 4 pages.

"Meat Press," <https://www.mpequipment.com/product-page/meat-press> [Retrieved May 1, 2019], 1 page.

"Space Saver Meat Press," FPEC, <https://www.fpeccorp.com/space-saver-meat-press> [Retrieved May 1, 2019], 1 page.

"Double Roller Conveyor," <https://ftiinc.org/products/double-roller-conveyor/#tab-id-1> [Retrieved May 1, 2019], 1 page.

"The Alco ASP Flattening Machine," <https://www.alco-food.com/en/products/convenience-technology/flatteningslicing/equal-flat-asp.html> [Retrieved May 1, 2019], 1 page.

"Platino Flattener," <https://marel.com/products-solutions/platino-flattener-for-poultry/#tab_techspecs> [Retrieved May 1, 2019], 1 page.

"3D Form Press," 3D Meat Press, <https://pujolas.com/en/machinery/3d-meat-press.html> [Retrieved May 1, 2019], 1 page.

* cited by examiner

MACERATOR DESIGN FOR PORTIONED CHICKEN BREAST FOR FAST FOOD RESTAURANTS

BACKGROUND

Fast food restaurants typically provide an alternative to beef sandwiches by offering chicken sandwiches. However, while beef can be ground and shaped into a correct size and weight portion, a problem with chicken meat, particular using whole chicken breasts in sandwiches is to procure breast portions having the correct weight range and size. A trend of increasing chicken breast size has led to using larger and thicker chicken breasts in sandwiches. A concern has arisen that larger chicken breasts are thicker and do not cover the current bun size. Another concern is the possibility of under cooking the thicker chicken breast meat. This disclosure proposes to solve the aforementioned problem and provide additional advantages.

SUMMARY

To address the problems of thicker chicken breast, this disclosure proposes a combination of macerating (i.e., cutting) and pressing to cut meat fibers of chicken breasts to prevent muscle memory and the chicken breast returning to the original thickness during further processing and cooking. The cut and pressed chicken breast portion shrinks less during cooking increasing bun coverage and lessening the risk of under cooked chicken.

In one example, a macerator can process portioned chicken breasts and other sandwich portions. The macerator is set up with two pairs of rollers. The first pair includes a macerator blade roller (castellated or star) with a blunt press roller, and the second pair includes a pair of blunt press rollers. Positioning motors with controllers allow adjustments to the spacing between rollers in a pair in 1 mm increments. The combination of macerator blades (star or castellated) cutting against a blunt roller and pressing with two press rollers prevents bounce back from muscle memory. In contrast using press rollers only, the muscle bounces back to its original thickness.

In an embodiment, a method for processing a protein-containing foodstuff portion to control the thickness comprises passing an raw protein-containing foodstuff portion between a first pair of rollers to make cuts on a surface of the raw protein-containing foodstuff portion, the first pair of rollers includes a first roller having cutting blades and a second roller having a non-cutting surface; and after the raw protein-containing foodstuff portion passes from the first pair of rollers, passing the raw protein-containing foodstuff portion between a second pair of rollers to press the raw protein-containing foodstuff portion, the second pair of rollers includes a third roller having a non-cutting surface and a fourth roller having a non-cutting surface.

In an embodiment, the raw protein-containing foodstuff portion includes chicken meat.

In an embodiment, the raw protein-containing foodstuff portion is a boneless and skinless chicken breast.

In an embodiment, the spacing of the first roller to the second roller is less than a thickness of the raw protein-containing foodstuff portion, and a spacing of the third roller from the fourth roller is less than a thickness of the raw protein-containing foodstuff portion.

In an embodiment, the first roller includes a plurality of castellated cutting discs, wherein the castellated cutting discs are arranged concentrically with the central axis of the first roller and the cutting sections of adjacent discs are separated axially.

In an embodiment, each castellated cutting disc includes multiple discrete arms extending radially outward which terminate in a radiused cutting edge, wherein a circular length of each cutting edge is about equal to a spacing between any two cutting edges which are regularly spaced on the disc and adjacent castellated cutting discs are rotationally aligned such that a cutting edge is adjacent to the spacing between cutting edges on an adjacent castellated cutting disc and a number of arms of a castellated cutting disc is about 20 to 30.

In an embodiment, the first roller includes a plurality of star cutting discs, wherein the star cutting discs are arranged concentrically with the central axis of the first roller and the cutting sections of adjacent discs are separated axially.

In an embodiment, each star cutting disc includes multiple discrete arms extending radially outward which terminate in a radiused cutting edge, wherein a circular length of each cutting edge is about twice a spacing between any two cutting edges which are regularly spaced on the disc and adjacent star cutting discs are rotationally aligned such that a cutting edge is adjacent to the spacing between cutting edges on an adjacent star cutting disc and a number of arms of a star cutting disc is about 20 to 30.

In an embodiment, the second, third, and fourth roller have similar textured surfaces.

In an embodiment, the second, third, and fourth roller have a texture including a repeating, regular pattern of protrusions and depressions.

In an embodiment, the first pair of rollers is positioned above the second pair of rollers to transfer the raw protein-containing foodstuff portion from the first pair of rollers to the second pair of rollers by gravity.

In an embodiment, the method further comprises cooking the raw protein-containing foodstuff portion after passing the second pair of rollers, and determining a thickness of the cooked protein-containing foodstuff portion has been reduced compared to a cooked protein-containing foodstuff portion that is not passed by the first pair of rollers and has been pressed.

In an embodiment, the method further comprises selecting a thickness range of the raw protein-containing foodstuff portion before passing the raw protein-containing foodstuff portion through the first and second pairs of rollers, and determining that the raw protein-containing foodstuff portion is within the thickness range after passing through the first and second pairs of rollers.

In an embodiment, a macerator comprises a first pair of rollers to make cuts on a surface of raw protein-containing foodstuff portions, the first pair of rollers includes a first roller having cutting blades and a second roller having a non-cutting surface; a second pair of rollers below the first pair of rollers, the second pair of rollers to press the raw protein-containing foodstuff portions, the second pair of rollers includes a third roller having a non-cutting surface and a fourth roller having a non-cutting surface; and a controller configured to make adjustments to a first spacing between the first and second rollers and to a second spacing between the third and fourth pair of rollers.

In an embodiment, the controller is configured to adjust the spacing between first and second roller and the spacing between the third and fourth roller in about 1 mm increments.

In an embodiment, the second, third, and fourth rollers have a same textured surface on an exterior of the rollers.

In an embodiment, a central axis of the first roller is parallel to a central axis of the second roller and the axes are at a same height from a reference.

In an embodiment, a central axis of the third roller is parallel to a central axis of the fourth roller and the axes are at a same height from a reference.

In an embodiment, the first roller includes a plurality of castellated cutting discs, wherein the castellated cutting discs are arranged concentrically with the central axis of the first roller and the cutting sections of adjacent discs are separated axially.

In an embodiment, each castellated cutting disc includes multiple discrete arms extending radially outward which terminate in a radiused cutting edge, wherein a circular length of each cutting edge is about equal to a spacing between any two cutting edges which are regularly spaced on the disc and adjacent castellated cutting discs are rotationally aligned such that a cutting edge is adjacent to the spacing between cutting edges on an adjacent castellated cutting disc and a number of arms of a castellated cutting disc is about 20 to 30.

In an embodiment, the first roller includes a plurality of star cutting discs, wherein the star cutting discs are arranged concentrically with the central axis of the first roller and the cutting sections of adjacent discs are separated axially.

In an embodiment, each star cutting disc includes multiple discrete arms extending radially outward which terminate in a radiused cutting edge, wherein a circular length of each cutting edge is about twice a spacing between any two cutting edges which are regularly spaced on the disc and adjacent star cutting discs are rotationally aligned such that a cutting edge is adjacent to the spacing between cutting edges on an adjacent star cutting disc and a number of arms of a star cutting disc is about 20 to 30.

In an embodiment, a method for processing a protein-containing foodstuff portion to control at least the thickness comprises cutting a raw protein-containing foodstuff portion to make cuts on a surface of the raw protein-containing foodstuff portion, the raw protein-containing foodstuff portion has a first initial thickness; and after the raw protein-containing foodstuff portion is cut, pressing the raw protein-containing foodstuff portion, wherein after pressing a thickness of the raw protein-containing foodstuff portion is reduced from the initial thickness.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
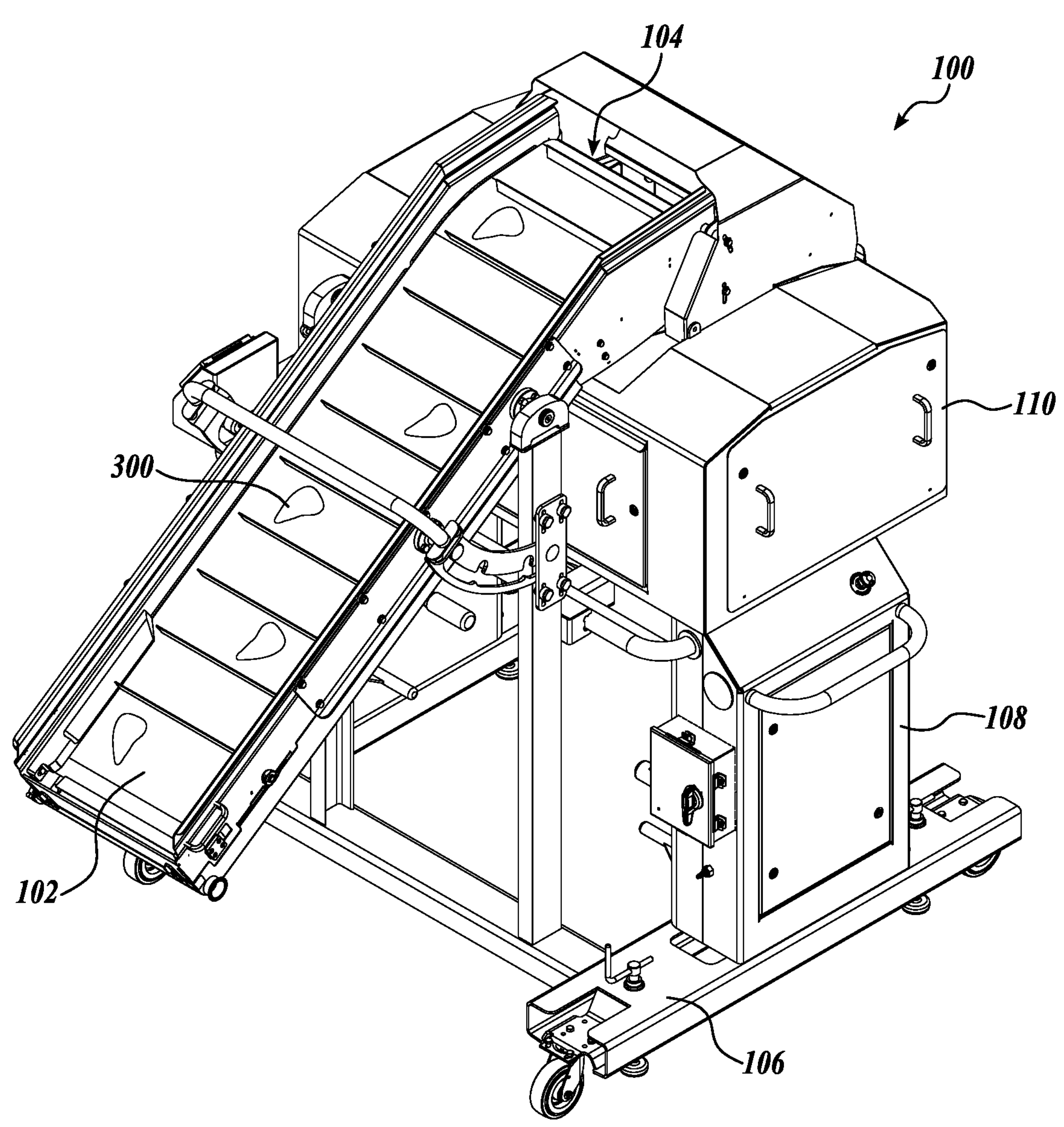
FIG. 1 is a diagrammatical illustration of a macerator.

To address the foregoing concerns, this disclosure provides methods and apparatus for cutting and then pressing meat fibers to a desired thickness to prevent muscle memory in raw protein-containing foodstuff portions reverting back to the original thickness. This processing then supplies a more consistent product to the restaurant.

Meat or any protein-containing foodstuff portion is the object for processing according to this disclosure. In particular, whole (not ground) raw boneless and skinless chicken breasts is one example of a protein-containing foodstuff portion processed according to this disclosure. Such chicken breasts can be described as having a rib side and a membrane side. The particular side of the chicken breast that is cut does not appear to lessen the advantages. Accordingly, the cutting of the chicken breasts on either the rib side or the membrane side can be practiced. Further, cutting or macerating according to this disclosure maintains the chicken breasts whole, meaning that the chicken breasts are not reduced into strips, ground, diced or otherwise rendered into discrete smaller portions. Further, the processing of cutting and pressing can be performed on fresh, non-frozen, and thawed protein-containing foodstuff portions. One application for the processed chicken breasts according to the disclosure is for use in sandwiches which require the chicken breast to generally be consistent in size, weight, and thickness to fit the bun.

With reference now to the drawing figures in which like reference numerals designate like parts throughout the disclosure, one embodiment of a food processing macerator 100 will be described. Here, reference can be made to U.S. Pat. No. 8,764,523, incorporated herein expressly by reference for all purposes. The food processing system of the prior patent describes an injector and a macerator. Systems described in the prior patent can be included in the macerator of the present disclosure, and the differences between the two macerators are described herein below and in the claims. For example, the prior patent describes a positioning mechanism for a single roller pair. Such description of the positioning mechanism can be incorporated into this disclosure modified for the control of the two roller pairs as opposed to the single roller pair in the prior patent. Furthermore, the positioning mechanism of the present disclosure can achieve movement of a roller in increments of about 1 mm to achieve the objects of the present disclosure.

Figure 2:
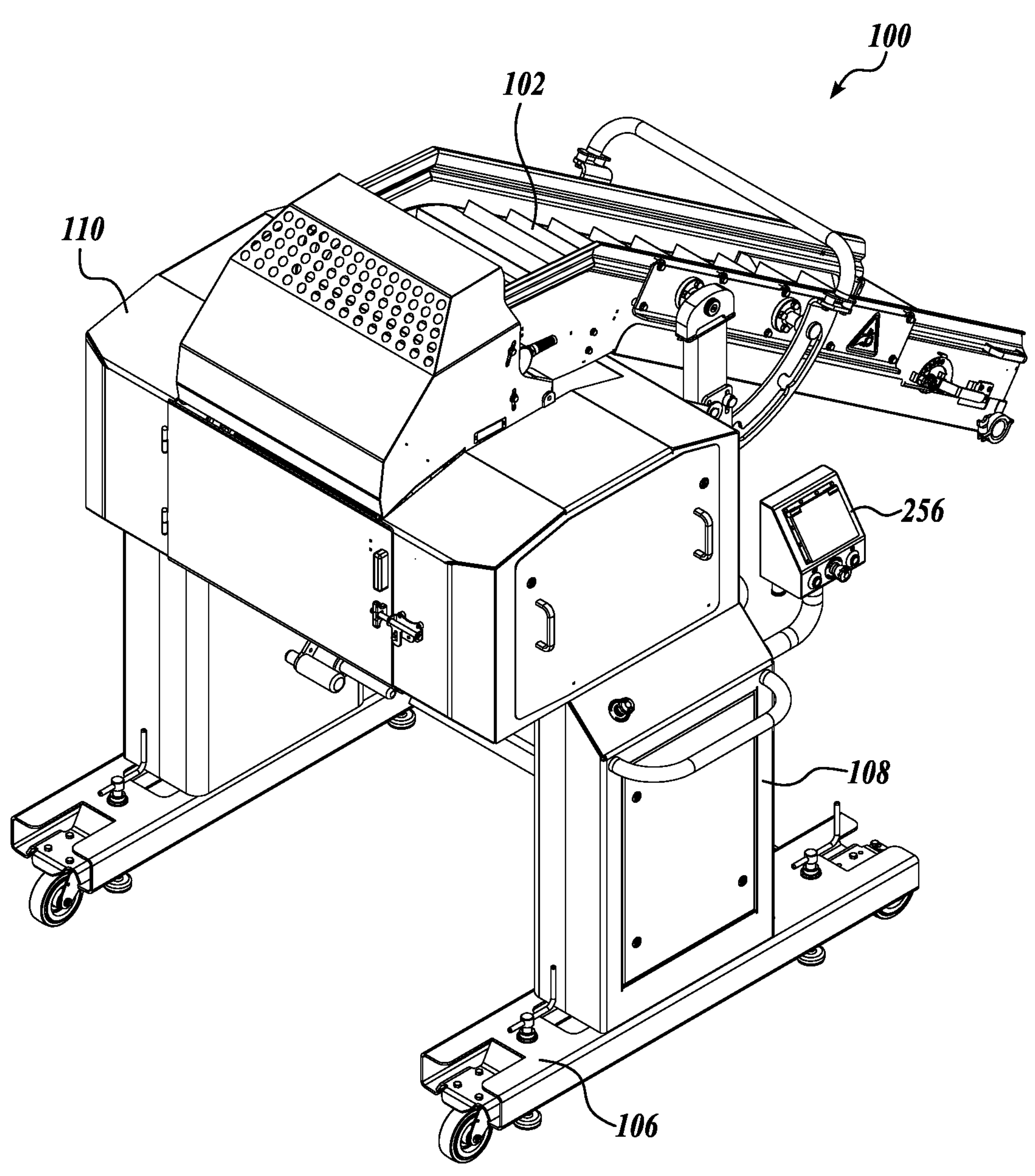
FIG. 2 is a diagrammatical illustration of the macerator of FIG. 1.
Figure 3:
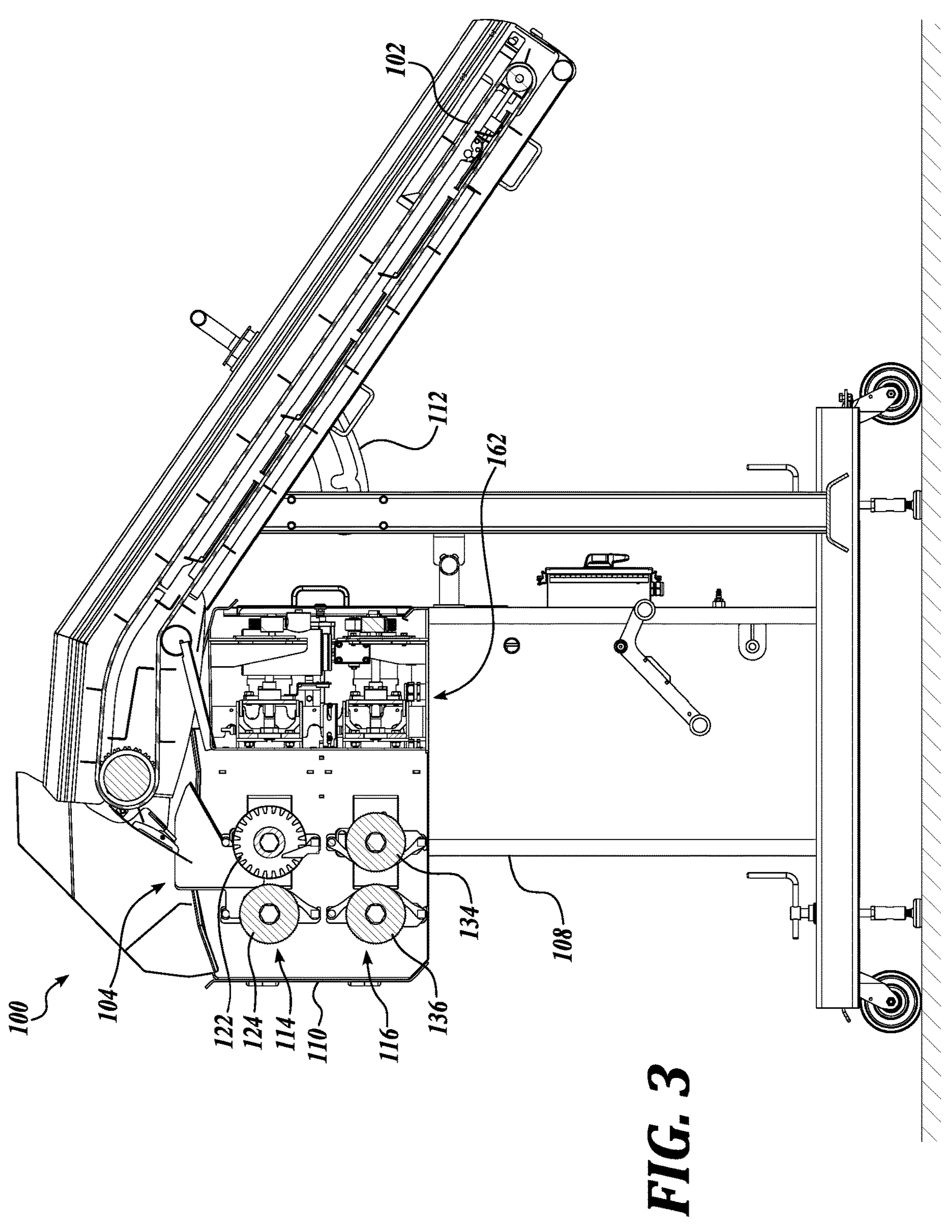
FIG. 3 is a diagrammatical illustration of the macerator of FIG. 1 with side covers removed showing the top and bottom roller pairs and the positioning mechanism.

Referring in general to the FIGS. 1 to 3, raw protein-containing foodstuff portions 300 are transferred to the macerator 100, for example, via the conveyor 102. In one example, the raw protein-containing foodstuff portions 300 that undergo processing are chicken breasts halves having an initial thickness. The conveyor 102 is connected to the macerator 100 and advances the raw protein-containing foodstuff portions 300 upwardly towards an inlet 104 leading into the first top roller pair 114. As shown in the FIGURES, the macerator 100 is illustrated as including a base 106 having a number of wheels and stationary supports that are movable with respect to the base 106 to selectively disengage the wheels from a support surface, i.e., a floor, and prevent the macerator 100 from moving. A vertical support 108 extends upwardly from the base 106 and supports a housing 110 above the base 106. The vertical support 108 is also connected to a support arm 112 that extends outwardly from one side of the support 108 and is used to support the conveyor 102 on the macerator 100.

Figure 4:
FIG. 4 is a diagrammatical illustration of the macerator of FIG. 1 with covers removed showing the top and bottom roller pairs and motors.

Referring now to FIGS. 3 and 4, the housing 110 for the macerator 100 encloses a first pair of rollers 114 and a second pair of rollers 116. The second pair of rollers 116 is placed beneath the first pair of rollers 114 such that the raw protein-containing foodstuff portions are transferred from the first pair of rollers 114 into the second pair of rollers 116 via gravity. However, the illustrated arrangement may be done for saving space by placing the two pairs of rollers 114, 116 into a single housing or machine.

Figure 5:
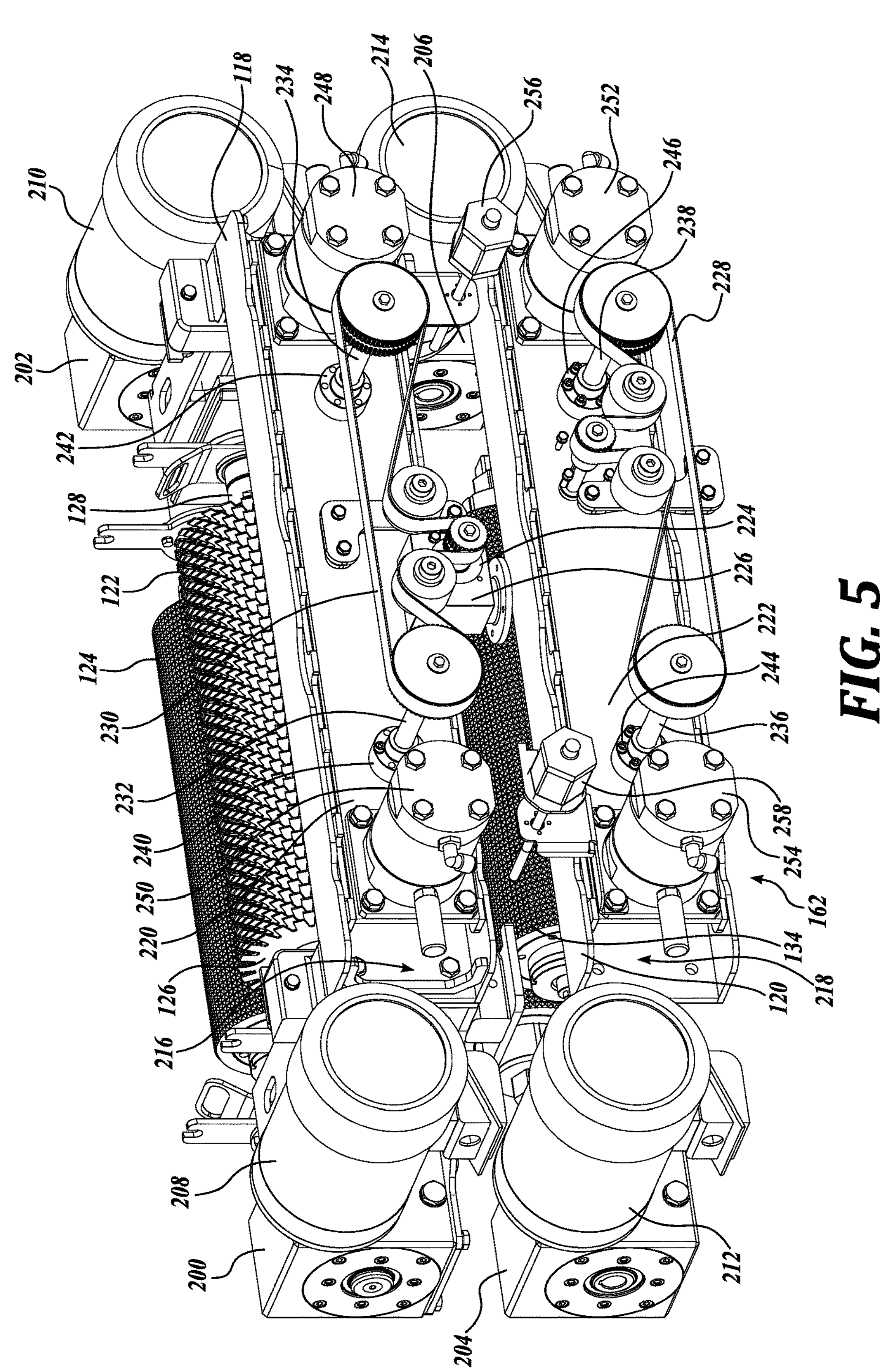
FIG. 5 is a diagrammatical illustration of the macerator of FIG. 1 with covers removed showing the top and bottom roller pairs, motors, and the positioning mechanism.

Referring to FIG. 5, both of the first top and second bottom pairs 114, 116 of rollers are supported on a respective top frame 118 and bottom frame 120, each frame 118, 120 generally being U-shaped with a long beam opposite an open end and two opposite side beams as the arms. Frame 118 supports the inside top roller 122 across the open end of the frame 118 between the two side arms of the frame 118, and frame 120 supports the inside bottom roller 134 across the open end of the frame 118 between the two side arms of the frame 120.

Positioned adjacent to the first roller 122 of the top pair 114 is a second non-cutting or blunt roller 124 used for pressing that is rotatably mounted to the housing 110. The first roller 122 and the second roller 124, each have a central axis, such that the central axis of the first roller 122 and the central axis of the second roller 124 will be parallel to each other. Furthermore, both the first roller 122 and the second roller 124 will lie at the same elevation, so that the central axis of the first roller 122 and the second roller 124 will be parallel and also pass through a horizontal plane.

The first roller 122 of the top roller pair 114 is used for cutting and can include, for example, castellated cutting blades or star cutting blades or more generally any cutting blade. In either type of cutting blade, the first roller 122 includes a plurality of cutting discs 126 arranged concentrically with the central shaft 128 of the first roller 122. For example, the cutting discs 126 can have a hole in the center which can then fit into the cylindrical shaft 128. The individual cutting discs 126 are separated from adjacent cutting discs by the use of spacers, such as bored cylinders placed on the shaft 128 between each cutting disc 126. As an example, the spacers can be about 8 mm to 17 mm in length. Therefore, the spacing between the cutting discs 126 of roller 122 is about 8 mm to 13 mm. In an example, a cutting roller with castellated blades can use an 8 mm spacing and accommodate about 63 discs, while a 13 mm spacing can accommodate 39 discs. A cutting roller with star blades can have about 53 discs. The foregoing is meant to provide examples to be used as a starting reference.

Figure 6:
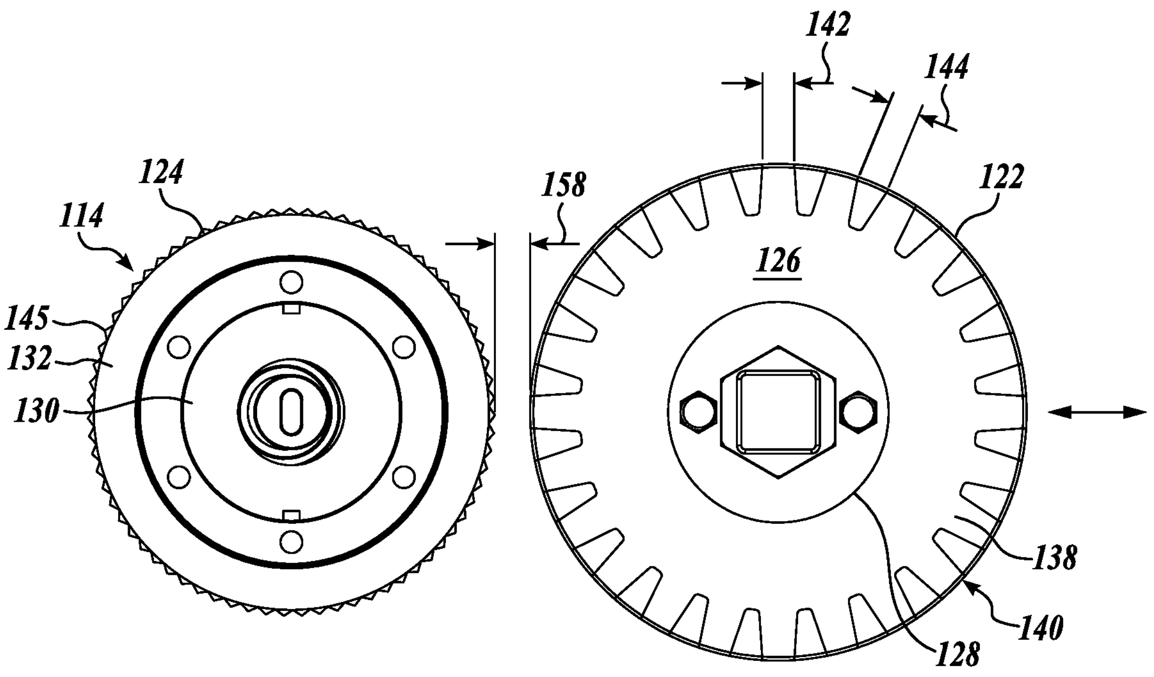
FIG. 6 is a diagrammatical illustration of the roller pairs and roller dimensions.
Figure 6:
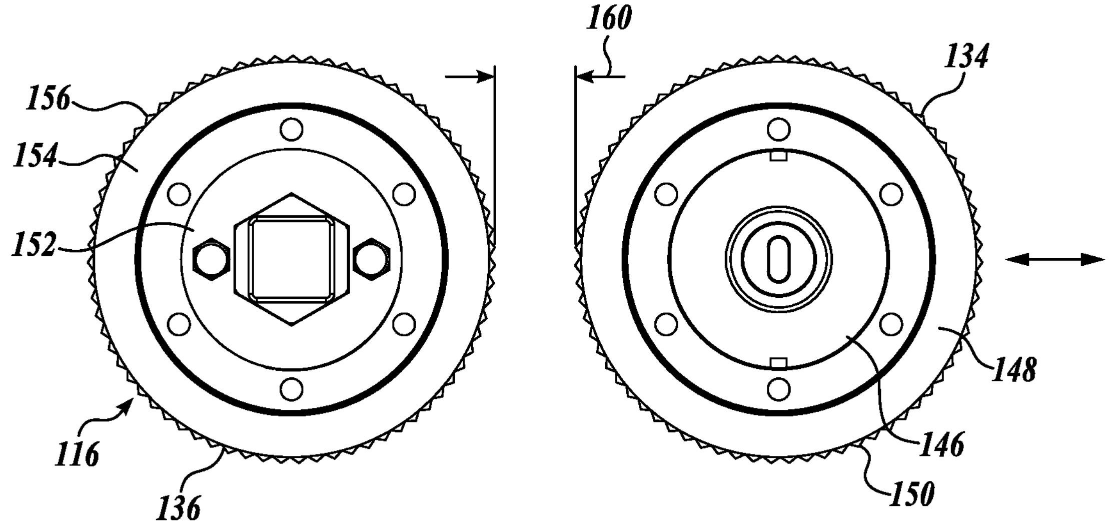

Referring to FIG. 6, the top roller pair 114 and bottom roller pair 116 are illustrated. The top inside cutting roller 122 can include a castellated cutting discs or star cutting discs or more generally any type of cutting disc. Both a castellated cutting disc and a star cutting disc of roller 122 includes multiple discrete arms 138 extending radially outward which terminate in a radiused cutting edge 140. While both a castellated cutting disc and a star cutting disc can have the same number of outward radiating arms 138, a castellated cutting disc uses blades having longer cutting edges than a star cutting disc. A circular length 142 of each cutting blade on a castellated cutting disc 126 is about equal to a spacing 144 between any two cutting edges 140 which are regularly spaced on the disc. In other words, the whole perimeter edge of a castellated cutting disc is divided into one-half comprised of cutting blades and one-half comprised of spaces between cutting blades. Adjacent castellated cutting discs 126 are rotationally aligned such that a cutting edge 140 of one disc is adjacent to the spacing 144 between cutting edges on an adjacent castellated cutting disc. As an example, the number of arms 136, and therefore cutting blades of a castellated cutting disc is about 20 to 30. However, the number of arms can vary based on the diameter of the cutting disc.

A star cutting disc is similar to a castellated cutting disc, except the circular length of each cutting edge is about half as long as the spacing between any two cutting edges which are regularly spaced on the disc. In other words, the whole perimeter edge of a star cutting disc is divided into one-third comprised of cutting blades and two-thirds comprised of spaces between cutting blades. Like castellated cutting discs, adjacent star cutting discs are rotationally aligned such that a cutting edge is adjacent to the spacing between cutting edges on an adjacent star cutting disc and a number of arms of a star cutting disc is about 20 to 30. However, the number of arms can vary based on the diameter of the cutting disc. Therefore, as can be appreciated cutting edges of the castellated cutting discs are longer compared to the cutting edges of a star cutting disc in the circular dimension. In some examples, it may also be possible to use cutting discs that have essentially the entire circumference as a cutting edge.

The second outside roller 124 of the top pair 114 of rollers is on the outside of the frame 118 and is a non-cutting roller. The second roller 124 has a central shaft 130 onto which a generally rigid cylinder 132 is secured. The cylinder 132 has an outer surface including a number of ridges or pyramid protrusions 145 extending outward on the surface that are adapted to press the protein-containing foodstuff portions against the opposing cutting roller 122.

For the bottom pair 116 of rollers, the third inside roller 134 is also a press roller and is similarly constructed with a central shaft 146 and a generally rigid cylinder 148 around the shaft 146. The rigid cylinder 148 can similarly have pyramid shaped protrusions 150 on the surface. The fourth outside roller 134 is also a press roller and is similarly constructed with a central shaft 152 and a generally rigid cylinder 154 around the shaft 152. The rigid cylinder 154 can similarly have pyramid shaped protrusions 156 on the surface. Similar to the top pair 114 of rollers, the bottom pair 116 of rollers 134 and 136 are parallel and at the same elevation so as to lie in the same horizontal plane. Further, the horizontal plane on which the top pair 114 of rollers 122, 124 lie can be parallel to the horizontal plane on which the bottom pair 116 of rollers 134, 136 lie.

The second bottom pair 116 of rollers is positioned below the top pair 114 of rollers such that the gap 158 between the first top roller 122 and the second top roller 124 is positioned generally over the gap 160 between the third bottom roller 134 and the fourth bottom roller 136. In this manner, the protein-containing foodstuff portions can be transferred by gravity by falling from the gap 158 from the first top pair 114 of rollers into the gap 160 of the second bottom pair of rollers 116.

The dimension of the gaps 158 and 160 can be adjusted by moving the inside top roller 122 and the inside bottom roller 134 as indicated by the positioning arrows. The inside top roller 122 and the inside bottom roller 134 can be adjusted independently by movement in the horizontal planes by the positioning system 162 of FIG. 5. Gaps 158 and 160 are therefore independently adjustable. Although, the inside rollers 122 and 134 are illustrated as being adjustable, other embodiments can be configured to adjust the outside rollers 124 and 136, or both rollers in a pair can be adjusted. For reference, the dimension of gap 158 between the top first roller 122 and second roller is on the order of 3 mm to 10 mm, such as 4 mm to 7 mm. The dimension of gap 160 between the bottom third roller 134 and fourth roller 136 is on the order of 5 mm to 15 mm, such as 8 mm to 10 mm. The gaps are generally measured from the outermost edges between rollers. The dimensions of gaps 158 and 160 will vary based on the initial thickness of the raw protein-containing foodstuff portions that will be processed.

Referring to FIG. 5, the positioning mechanism 162 will be described. As to not obscure the components of the positioning mechanism 162, not all the support structure is being illustrated. The central shaft of each roller is operably connected to a motor. Shaft of roller 122 is connected to motor 200. Shaft of roller 124 is connected to motor 202. Shaft of roller 134 is connected to motor 204. Shaft of roller 136 is connected to motor 206. Motors 200, 202, 204, and 206 are connected to an appropriate controller that can receive commands from the user interface control box 256 (FIG. 4).

The second outside roller 124 is affixed to the housing 110 in a manner that enables the roller 124 to rotate with regard to the housing 110. The fourth outside roller 136 is similarly affixed to the housing 110 in a manner that enables the roller 136 to rotate with regard to the housing 110.

The first roller 122 is operably connected to the arms of the frame 118 at each end, and the corresponding motor 200 and air cylinder 208 for the first roller 122 is also connected to the frame 118 for movement therewith. Similarly, the third roller 134 is operably connected to the arms of the frame 120 at each end, and the corresponding motor 204 and air cylinder 212 for the third roller is also connected to the frame 120 for movement therewith. The second top roller 124 and the fourth bottom roller 136 can be fixed to be stationary with respect to the housing 110.

The movement of the inside top roller 122 and the inside bottom roller 134 can be adjusted to control the gaps 158, 160 through the operation of the positioning mechanism 162. The first roller 122 is rotatably mounted to the arms to position the first roller 122 adjacent the fixed second roller 124 that is rotatably mounted directly to the housing 110. Similarly, the third roller 134 is rotatably mounted to the arms to position the third roller 134 adjacent the fixed fourth roller 136 that is rotatably mounted directly to the housing 110. On the other hand, the frames 118 and 120 are configured to move and thereby move rollers 122 and 134 with respect to the housing 110, while the rollers 134 and 136 remain fixed in place with respect to the housing 110.

The central portions of both frames 118, 120 are formed with a center panel and a pair of side panels extending outwardly from opposed sides of the center panel to define channels 216 and 218 in frames 118 and 120, respectively. A slide 220 that generally conforms in shape to the channel 216 is received within the channel 216. The slide 220 can be moved together with the frame 118. Slide 220 can also be moved relative to the frame 118. A slide 222 that generally conforms in shape to the channel 218 is received within the channel 218. The slide 222 can be moved together with the frame 120. Slide 222 can also be moved relative to the frame 120.

To move the frame and slide together as a unit, there is a motor and serpentine belt to drive two jackscrews. The motor, belt and jackscrews remain fixed to the housing, thereby, moving the frame and slide together.

Positioning of the roller 122 is accomplished by actuation of the motor 226 which drives a serpentine belt 230. In turn the belt 230 drives two jackscrews on the slide 220. Slide 220 has jackscrews 232, 234 positioned near the ends of the slide 220. Positioning of the roller 134 is accomplished by actuation of the motor 224 which drives a serpentine belt 228. In turn the belt 228 drives two jackscrews on the slide 222. Slide 222 has jackscrews 236, 238 positioned near the ends of the slide 222. Upon operation of either or both of the motors 224, 226, the belts 228 and 230 rotate the jack screws of the respective slide 222, 220. Motors 224, 226 can include a stepper motor, a geared head motor with sensors, etc., to control the operation of the belts 228, 230.

Jackscrew 232 is engaged in a threaded sleeve 240, and jackscrew 234 is engaged in a threaded sleeve 242 on slide 220. Jackscrew 236 is engaged in a threaded sleeve 244, and jackscrew 238 is engaged in a threaded sleeve 240 of slide 222. In turn, slide 220 is attached to the frame 118 that is movably, e.g., slidably, secured to the housing 110, and the slid 222 is attached to the frame 120 that is also movably, e.g. slidably, secured to the housing 110. When the jackscrews are rotated by the operation of the respective motor, the jackscrews move the slide to which they are attached along the jackscrews depending upon the direction of rotation of the jackscrews, and thereby also move the frame and corresponding roller.

The movement of the slides 220, 222 in relation to the frames 118, 120 is described. The slide 220 is received within the channel 216 of frame 118 and is operably connected to the center panel of the frame 118 by two air cylinder shafts which extend though apertures in the slide 220 into engagement with a respective air cylinder 248, 250 at each end of the slide 220. Similarly, the slide 222 is received within the channel 218 of frame 120 and is operably connected to the center panel of the frame 120 by two air cylinder shafts which extend through apertures in the slide 222 into engagement with a respective air cylinder 252, 254 at each end of the slide 222. The air cylinders 248, 250 are fixed to the slide 220, and the air cylinders 252, 254 are fixed to the slide 220. By operating the air cylinder shafts, the movement of the frames 118, 120 with respect to the slides 220, 222 can be accomplished. The air cylinders are operably connected to a controller that is, in turn, operably connected to an air supply and to the control box 256. The control box 256 can be used to send a signal to operate the air supply to pressurize one or the other pair of air cylinders on one or both slides 220, 222 to the specified air pressure value. As a result, the air cylinder shafts of the selected slide are biased outwardly from the respective cylinder against the respective frame 118, 120.

The connection of frames 118, 120 to the slides 220 and 222 via the air shafts from the air cylinders, allow the movement of the slides 220, 220 in response to the operation of the motors 224, 226 to cause the frames 118, 120, as well as the rollers 122, 134 mounted thereto, to move closer to or further from the fixed rollers 124, 136. The amount of movement of the slides 220, 222, and consequently the frames 118, 120 and rollers 122, 134 relative to the fixed rollers 124, 136 can be controlled by utilizing the control box 256.

After the slides 220, 222, and consequently the frames 118, 120, have been positioned by the motors 224, 226, the frames 118, 120 can move relative to the slides 220, 222 due to the operation of the air cylinders 248, 250 on slide 220 and air cylinders 252, 254 on slide 222.

Whether the rollers 122 and 134 are moved as a result of the operation of the motors 224, 226 or through the air cylinders 248, 250, 252, 254, the actual position of the roller 122 can be constantly monitored by the use of a positioning sensor 256, and the position of the roller 134 can be constantly monitored by the position sensor 258. A probe extends outwardly from the sensor housings towards the respective roller such that the tip of the probe is positioned adjacent the respective roller 122, 134. In one embodiment, the sensors 256, 258 are configured as magnetic transducers to detect the position of the roller as a result of the magnetic interaction of the probe with the roller. In response to the position of the rollers sensed by the sensors, the position of the rollers can be adjusted, if necessary, or monitored during the operation of the macerator and adjusted by the control box 256.

The control box 256 includes various input devices, such as buttons, switches, keypads or other suitable hard wired or wireless input devices, that enable an individual to select the operating parameters for the macerator 100. The control box 256 may include a suitable electronic central processing unit (CPU) and electronic storage medium in which is stored a number of preset operating parameters for the macerator 100 that correspond to the desired settings for the macerator 100 for use in processing certain types the protein-containing foodstuff portions. Thus, by providing a particular input on the control box 256, the CPU can access the operational settings in the storage medium associated with that input and can properly configure the macerator 100 for use in processing the particular protein-containing foodstuff portions.

In operation, an operator selects an input on the control box 256 corresponding to a particular protein-containing foodstuff portion to be processed by the macerator 100. Upon receiving the desired input, a processor of the control box 256 accesses the storage medium to determine the proper configuration or setting for the first roller 122 in the top roller pair 114 and the third roller in the bottom roller pair 116. Once the proper settings for these items are determined, the processor of the control box 256 sends a signal to the servomotors 224, 226 on the macerator 100 to adjust the position or other operational configuration for the first roller 50 and third roller in the macerator 100.

For reference, the gap 158 of the top pair of rollers 122, 124 is in the range of 2 mm to 10 mm, such as 3 mm to 8 mm or 4 mm to 7 mm. The gap 160 of the bottom pair of rollers 134, 136 is on the order of 5 mm to 15 mm, such as 8 mm to 10 mm. For a 180 mm blade, the liner velocity or the tip speed of the blade edges is on the order of about 3.61 ft/sec.

In an embodiment, a method for processing a protein-containing foodstuff portion 300 to control the thickness comprises passing an raw protein-containing foodstuff portion 300 between a first pair of rollers 122, 124 to make cuts on a surface of the raw protein-containing foodstuff portion, the first pair of rollers includes a first roller having cutting blades and a second roller having a non-cutting surface; and after the raw protein-containing foodstuff portion passes from the first pair of rollers, passing the raw protein-containing foodstuff portion between a second pair of rollers 134, 136 to press the raw protein-containing foodstuff portion, the second pair of rollers includes a third roller having a non-cutting surface and a fourth roller having a non-cutting surface.

In an embodiment, the raw protein-containing foodstuff portion includes chicken meat.

In an embodiment, the raw protein-containing foodstuff portion is a boneless and skinless chicken breast.

In an embodiment, the spacing of the first roller to the second roller is less than a thickness of the raw protein-containing foodstuff portion, and a spacing of the third roller from the fourth roller is less than a thickness of the raw protein-containing foodstuff portion.

In an embodiment, the first roller 122 includes a plurality of castellated cutting discs, wherein the castellated cutting discs are arranged concentrically with the central axis of the first roller and the cutting sections of adjacent discs are separated axially.

In an embodiment, each castellated cutting disc includes multiple discrete arms extending radially outward which terminate in a radiused cutting edge, wherein a circular length of each cutting edge is about equal to a spacing between any two cutting edges which are regularly spaced on the disc and adjacent castellated cutting discs are rotationally aligned such that a cutting edge is adjacent to the spacing between cutting edges on an adjacent castellated cutting disc and a number of arms of a castellated cutting disc is about 20 to 30.

In an embodiment, the first roller 122 includes a plurality of star cutting discs, wherein the star cutting discs are arranged concentrically with the central axis of the first roller and the cutting sections of adjacent discs are separated axially.

In an embodiment, each star cutting disc includes multiple discrete arms extending radially outward which terminate in a radiused cutting edge, wherein a circular length of each cutting edge is about twice a spacing between any two cutting edges which are regularly spaced on the disc and adjacent star cutting discs are rotationally aligned such that a cutting edge is adjacent to the spacing between cutting edges on an adjacent star cutting disc and a number of arms of a star cutting disc is about 20 to 30.

In an embodiment, the second, third, and fourth roller 124, 134, 136 have similar textured surfaces.

In an embodiment, the second, third, and fourth roller have a texture including a repeating, regular pattern of protrusions and depressions.

In an embodiment, the first pair of rollers is positioned above the second pair of rollers to transfer the raw protein-containing foodstuff portion from the first pair of rollers to the second pair of rollers by gravity.

In an embodiment, the method further comprises cooking the raw protein-containing foodstuff portion 300 after passing the second pair of rollers, and determining a thickness of the cooked protein-containing foodstuff portion has been reduced compared to a cooked protein-containing foodstuff portion that is not passed by the first pair of rollers and has been pressed.

In an embodiment, the method further comprises selecting a thickness range of the raw protein-containing foodstuff portion before passing the raw protein-containing foodstuff portion through the first and second pairs of rollers, and determining that the raw protein-containing foodstuff portion is within the thickness range after passing through the first and second pairs of rollers.

In an embodiment, a macerator 100 comprises a first pair of rollers 122, 124 to make cuts on a surface of raw protein-containing foodstuff portions 300, the first pair of rollers includes a first roller 122 having cutting blades and a second roller 124 having a non-cutting surface; a second pair of rollers 134, 136 below the first pair of rollers, the second pair of rollers to press the raw protein-containing foodstuff portions, the second pair of rollers includes a third roller 134 having a non-cutting surface and a fourth roller 136 having a non-cutting surface; and a controller configured to make adjustments to a first spacing between the first and second rollers and to a second spacing between the third and fourth pair of rollers.

In an embodiment, the controller 256 is configured to adjust the spacing between first and second roller and the spacing between the third and fourth roller in about 1 mm increments.

In an embodiment, the second, third, and fourth rollers have a same textured surface on an exterior of the rollers.

In an embodiment, a central axis of the first roller is parallel to a central axis of the second roller and the axes are at a same height from a reference.

In an embodiment, a central axis of the third roller is parallel to a central axis of the fourth roller and the axes are at a same height from a reference.

In an embodiment, the first roller 122 includes a plurality of castellated cutting discs, wherein the castellated cutting discs are arranged concentrically with the central axis of the first roller and the cutting sections of adjacent discs are separated axially.

In an embodiment, each castellated cutting disc includes multiple discrete arms extending radially outward which terminate in a radiused cutting edge, wherein a circular length of each cutting edge is about equal to a spacing between any two cutting edges which are regularly spaced on the disc and adjacent castellated cutting discs are rotationally aligned such that a cutting edge is adjacent to the spacing between cutting edges on an adjacent castellated cutting disc and a number of arms of a castellated cutting disc is about 20 to 30.

In an embodiment, the first roller 122 includes a plurality of star cutting discs, wherein the star cutting discs are arranged concentrically with the central axis of the first roller and the cutting sections of adjacent discs are separated axially.

In an embodiment, each star cutting disc includes multiple discrete arms extending radially outward which terminate in a radiused cutting edge, wherein a circular length of each cutting edge is about twice a spacing between any two cutting edges which are regularly spaced on the disc and adjacent star cutting discs are rotationally aligned such that a cutting edge is adjacent to the spacing between cutting edges on an adjacent star cutting disc and a number of arms of a star cutting disc is about 20 to 30.

In an embodiment, a method for processing a protein-containing foodstuff portion 300 to control at least the thickness comprises cutting a raw protein-containing foodstuff portion to make cuts on a surface of the raw protein-containing foodstuff portion, the raw protein-containing foodstuff portion has a first initial thickness; and after the raw protein-containing foodstuff portion is cut, pressing the raw protein-containing foodstuff portion, wherein after pressing a thickness of the raw protein-containing foodstuff portion is reduced from the initial thickness.

EXAMPLE 1

Test Objective

To demonstrate the advantages of maceration and press on right vs left on raw and cooked butterfly breasts.

Treatments

Butterfly Breast—Left vs Right

Left vs right portioned butterfly breast. The right portion is macerated and pressed, while the left portion is untreated. Measurements recorded at raw and cooked stages.

Macerator Set Up

Top roller—castellated and press rollers

Bottom roller—press and press rollers

Test Plan

Right vs Left Butterfly

Repetitions of 4 butterflied breasts were run through a water jet portioner to create sandwich portion fillets. The right fillet was assigned to the maceration and pressing and the left portion was left untreated. The initial thickness was taken of the right side portions. The right portions were then run through the macerator outfitted with a single castellated blade and press roller on the top and two press rollers in the bottom position. After maceration and press, the fillets were measured for thickness, length, and width. The untreated portions were also measured for thickness, length, and width. The portions were breaded by hand in a test kitchen and then were fried for approximately 3 minutes. After cook, the breasts were remeasured to determine the change that was seen during cooking.

Measurement Data Collection

Macerator Settings

| Position | Settinq | Distance |
|---|---|---|
| Top position | 0.375 | 2 mm |
| Bottom position | 1.250 | 10 mm |

Left vs Right Butterfly Raw and Cooked Data

| Trial 1 Raw | | | | | | | |
|---|---|---|---|---|---|---|---|
| Left Portion Untreated Raw Measurements | | | | Right Portion Macerated Raw Measurements | | | |
| Portion | Length | Width | Thickness | Portion | Length | Width | Thickness |
| 1 | 118.0 | 87.0 | 22.0 | 1 | 139.0 | 99.0 | 14.5 |
| 2 | 126.0 | 94.0 | 22.0 | 2 | 123.5 | 103.0 | 14.4 |
| 3 | 103.0 | 84.0 | 24.0 | 3 | 131.0 | 91.0 | 18.0 |
| 4 | 109.0 | 93.5 | 19.5 | 4 | 136.0 | 103.0 | 16.0 |
| Average | 114.00 | 89.63 | 21.88 | Average | 132.38 | 99.00 | 15.73 |
| Difference | | | | Difference | 18.38 | 9.38 | −6.15 |

-continued

| Trial 1 Cooked | | | | | | | |
|---|---|---|---|---|---|---|---|
| Left Portion Untreated Cooked Measurements | | | | Right Portion Macerated Cooked Measurements | | | |
| Portion | Length | Width | Thickness | Portion | Length | Width | Thickness |
| 1 | 85.0 | 69.0 | 32.0 | 1 | 111.0 | 84.0 | 25.5 |
| 2 | 93.0 | 76.5 | 29.0 | 2 | 103.0 | 81.0 | 26.0 |
| 3 | 93.0 | 70.5 | 33.0 | 3 | 110.0 | 73.0 | 25.5 |
| 4 | 93.0 | 83.0 | 31.0 | 4 | 124.0 | 96.5 | 26.0 |
| Average | 91.00 | 74.75 | 31.25 | Average | 112.00 | 83.63 | 25.75 |
| | | | | Difference | 21.00 | 8.88 | −5.50 |

| Trial 2 Raw | | | | | | | |
|---|---|---|---|---|---|---|---|
| Left Portion Untreated Raw Measurements | | | | Right Portion Macerated Raw Measurements | | | |
| Portion | Length | Width | Thickness | Portion | Length | Width | Thickness |
| 1 | 120.0 | 92.0 | 24.5 | 1 | 129.0 | 111.0 | 15.0 |
| 2 | 123.0 | 91.5 | 22.0 | 2 | 134.0 | 99.0 | 16.0 |
| 3 | 122.0 | 104.0 | 20.5 | 3 | 129.0 | 100.0 | 16.0 |
| 4 | 130.0 | 85.0 | 20.5 | 4 | 133.0 | 96.0 | 15.0 |
| Average | 123.75 | 93.13 | 21.88 | Average | 131.25 | 101.50 | 15.50 |
| Difference | | | | Difference | 7.50 | 8.38 | −6.38 |

| Trial 2 Cooked | | | | | | | |
|---|---|---|---|---|---|---|---|
| Left Portion Untreated Cooked Measurements | | | | Right Portion Macerated Cooked Measurements | | | |
| Portion | Length | Width | Thickness | Portion | Length | Width | Thickness |
| 1 | 92.0 | 85.0 | 32.0 | 1 | 100.0 | 89.0 | 28.5 |
| 2 | 88.0 | 79.5 | 31.5 | 2 | 101.0 | 71.0 | 22.0 |
| 3 | 92.0 | 78.0 | 31.0 | 3 | 108.0 | 74.0 | 26.0 |
| 4 | 101.0 | 69.0 | 30.5 | 4 | 119.0 | 83.0 | 23.0 |
| Average | 93.25 | 77.88 | 31.25 | Average | 107.00 | 79.25 | 24.88 |
| Difference | | | | Difference | 13.75 | 1.38 | −6.38 |

| Trial 3 Raw | | | | | | | |
|---|---|---|---|---|---|---|---|
| Left Portion Untreated Raw Measurements | | | | Right Portion Macerated Raw Measurements | | | |
| Portion | Length | Width | Thickness | Portion | Length | Width | Thickness |
| 1 | 119.0 | 92.0 | 21.0 | 1 | 130.0 | 95.0 | 15.0 |
| 2 | 115.0 | 94.0 | 23.0 | 2 | 133.0 | 98.0 | 14.0 |
| 3 | 100.0 | 89.5 | 23.0 | 3 | 177.0 | 97.0 | 15.0 |
| 4 | 106.0 | 93.0 | 20.0 | 4 | 125.0 | 103.0 | 15.0 |
| Average | 110.00 | 92.13 | 21.75 | Average | 126.25 | 98.25 | 14.75 |
| Difference | | | | Difference | 16.25 | 6.13 | −7.00 |

| Trial 3 Cooked | | | | | | | |
|---|---|---|---|---|---|---|---|
| Left Portion Untreated Cooked Measurements | | | | Right Portion Macerated Cooked Measurements | | | |
| Portion | Length | Width | Thickness | Portion | Length | Width | Thickness |
| 1 | 96.0 | 78.0 | 30.5 | 1 | 111.0 | 84.0 | 24.0 |
| 2 | 89.0 | 80.5 | 29.5 | 2 | 99.0 | 79.0 | 23.5 |
| 3 | 88.0 | 77.5 | 34.0 | 3 | 106.0 | 80.5 | 26.0 |
| 4 | 87.0 | 78.0 | 30.5 | 4 | 98.0 | 78.0 | 28.0 |
| Average | 90.00 | 78.50 | 31.13 | Average | 103.50 | 80.38 | 25.38 |
| Difference | | | | Difference | 13.50 | 1.88 | −5.75 |

Macerator Settings Adjusted to Increase Cut and Press Depth.

| Position | Setting | Distance |
|---|---|---|
| Top position | 0.250 | 2 mm |
| Bottom position | 1.000 | 8 mm |

| Trial 4 Raw | | | | | | | |
|---|---|---|---|---|---|---|---|
| Left Portion Untreated Raw Measurements | | | | Right Portion Macerated Raw Measurements | | | |
| Portion | Length | Width | Thickness | Portion | Length | Width | Thickness |
| 1 | 127.0 | 91.0 | 22.0 | 1 | 131.0 | 108.0 | 13.0 |
| 2 | 119.0 | 86.0 | 22.0 | 2 | 123.0 | 119.0 | 13.0 |
| 3 | 115.0 | 85.0 | 22.00 | 3 | 150.0 | 97.0 | 12.0 |
| 4 | 122.0 | 97.0 | 21.0 | 4 | 144.0 | 110.0 | 12.5 |
| Average | 120.75 | 89.75 | 21.75 | Average | 137.00 | 108.50 | 12.63 |
| Difference | | | | Difference | 16.25 | 18.75 | −9.13 |

| Trial 4 Cooked | | | | | | | |
|---|---|---|---|---|---|---|---|
| Left Portion Untreated Cooked Measurements | | | | Right Portion Macerated Cooked Measurements | | | |
| Portion | Length | Width | Thickness | Portion | Length | Width | Thickness |
| 1 | 102.0 | 79.5 | 30.0 | 1 | 109.0 | 84.5 | 20.0 |
| 2 | 97.0 | 67.0 | 32.0 | 2 | 97.0 | 87.0 | 23.0 |
| 3 | 92.0 | 74.5 | 27.5 | 3 | 119.0 | 74.0 | 21.0 |
| 4 | 97.0 | 74.0 | 28.5 | 4 | 116.0 | 87.0 | 21.0 |
| Average | 97.00 | 73.75 | 29.50 | Average | 110.25 | 83.13 | 21.25 |
| Difference | | | | Difference | 13.25 | 9.38 | −8.25 |

Results

Left vs Right Butterfly Thickness Results

From an evaluation of the data in the tables above, it can be seen that the average cooked thickness of the right fillet that was macerated and pressed was 25.33 mm whereas the average thickness of the left fillets that were hand flattened had a thickness of 31.2 mm. Therefore, the fillets that were macerated and pressed resulted in an average of 5.87 mm thinner than the untreated or hand flattened fillets after cooking.

EXAMPLE 2

Test Objective

To demonstrate the advantage maceration and pressing has on reducing the thickness of the chicken breast sandwich portions and to mimic the in-plant or in restaurant hand filleting that is currently being done to eliminate the ridge in the portioned breasts. Both a castellated blade roller and a star blade roller were tested.

Macerator Setup

Castellated Blade Roller

Top roller pair—castellated cutting roller and press roller

Bottom roller pair—two press rollers

Star Blade Roller

Top roller pair—star cutting roller and press roller

Bottom roller pair—two press rollers

Test Observations

Castellated Roller

At the start of the test, breasts were run through the macerator at different settings to determine the best setting for the castellated blade roller and press roller set up. The settings used are listed in a table below. Two batches were run using this blade type and settings. The macerated product was then tumbled with the seasoning mix and packaged for further evaluation.

Macerator Settings

| Position | Setting | Distance between rollers |
|---|---|---|
| Top setting | 0.875 | 7 mm |
| Bottom setting | 1.250 | 10 mm |

Star Roller

After the castellated roller test, the castellated roller was replaced with the star blade roller. Preliminary runs with the star blade roller were run to determine the settings. The settings are listed below in the table. The settings were closer for the top and bottom rollers as compared to the castellated blade roller. The setting of the top roller pair being lower can be attributed to star blades producing a puncture type of cut to the product and not as much of a slice action that is seen with the castellated blades. The setting of the bottom pair was lower to be able to press harder to get a similar thickness. The puncture cuts on the muscles rather than slice required pressing harder to get the muscle to open up similar to breasts macerated with castellated blades. The star blade used a closer setting because the cut in the meat is much less from this style of knife.

Macerator Settings

| Position | Setting | Distance between rollers |
|---|---|---|
| Top setting | 0.500 | 4 mm |
| Bottom setting | 1.000 | 8 mm |

EXAMPLE 3

This example is to demonstrate the control of thickness of raw chicken breasts. The macerator setup includes a top pair of rollers including the castellated cutting roller in the top front and a press roller in the top back, and the bottom pair included two similar press rollers. A spacing of 13 mm used in the top front. Chicken breasts were hand loaded into the macerator changing from rib side maceration to membrane side maceration randomly. The data listed in the table below shows the raw thickness compared to the macerated and pressed thickness using two pairs of rollers. The thickness measurement that is out of range is shown underlined and bolded.

A target thickness range is selected have a lower limit of 12.7 mm and an upper limit of 17.8 mm. The results show that out of 67 breasts, 22 breasts (or 32.84%) were out of spec of the thickness range before maceration and pressing. After maceration and pressing, only 4 breasts (or 5.97%) were out of spec.

Therefore, with the processing as described herein, the amount out of spec breasts decreased by 81.82%. (26.87% decrease in out of spec/32.84% initial percentage out of spec).

| Breast | Raw Thickness | Macerated and Pressed Thickness |
|---|---|---|
| 1 | 16.9 | 13.0 |
| 2 | 16.8 | **10.9** |
| 3 | **19.3** | 16.0 |
| 4 | **21.2** | 13.5 |
| 5 | **18.0** | 13.2 |
| 6 | 17.5 | 13.0 |
| 7 | 16.0 | 13.2 |
| 8 | 16.5 | 15.0 |
| 9 | 14.5 | 12.8 |
| 10 | 15.2 | 13.6 |
| 11 | **19.5** | 16.0 |
| 12 | **18.2** | 16.5 |
| 13 | 16.8 | 15.0 |
| 14 | 17.2 | 14.4 |
| 15 | 16.7 | 16.3 |
| 16 | 16.4 | 14.9 |
| 17 | 15.4 | 14.0 |
| 18 | 15.0 | 14.7 |
| 19 | 16.4 | 13.5 |
| 20 | 13.3 | 13.0 |
| 21 | 17.2 | 14.7 |
| 22 | **18.9** | 15.9 |
| 23 | **19.0** | 16.5 |
| 24 | **21.1** | 17.7 |
| 25 | **19.5** | 16.5 |
| 26 | **18.0** | 15.6 |
| 27 | **19.2** | 15.9 |
| 28 | **22.0** | 16.1 |
| 29 | **19.3** | 15.5 |
| 30 | **19.3** | 17.0 |
| 31 | **19.1** | 14.8 |
| 32 | **17.9** | 15.0 |
| 33 | 14.2 | 14.1 |
| 34 | 15.5 | 14.8 |
| 35 | **18.2** | 16.0 |
| 36 | 17.8 | 14.1 |
| 37 | 17.5 | 15.9 |
| 38 | 15.6 | 14.5 |
| 39 | 15.7 | 13.3 |
| 40 | 14.4 | 13.0 |
| 41 | 15.3 | 13.5 |
| 42 | **19.1** | 16.1 |
| 43 | 15.6 | **12.3** |
| 44 | **21.2** | 13.8 |
| 45 | **20.0** | 15.3 |
| 46 | 15.1 | 13.8 |
| 47 | 15.4 | 13.6 |
| 48 | 16.1 | 15.0 |
| 49 | 15.6 | 14.4 |
| 50 | 13.4 | 13.3 |
| 51 | 17.0 | 14.9 |
| 52 | 16.3 | 15.0 |
| 53 | 14.4 | 13.8 |
| 54 | 14.6 | **11.5** |
| 55 | 15.3 | 14.0 |
| 56 | 13.9 | 14.1 |
| 57 | **18.0** | 15.1 |
| 58 | 13.3 | 13.3 |
| 59 | 14.8 | 12.9 |
| 60 | 13.4 | 12.7 |
| 61 | 14.3 | 13.1 |
| 62 | 14.3 | 14.1 |
| 63 | 14.4 | 13.5 |
| 64 | 16.1 | **12.0** |
| 65 | 13.7 | 12.7 |
| 66 | 15.1 | 15.0 |
| 67 | **19.0** | 15.8 |
| Bolded Cells | **22** | **4** |

While illustrative embodiments have been illustrated and described, it will be appreciated that various changes can be made therein without departing from the spirit and scope of the invention.

The embodiments of the invention in which an exclusive property or privilege is claimed as defined as follows:

1. A macerator, comprising:

a conveyor for conveying raw protein-containing foodstuff portions, wherein the raw protein-containing foodstuff portions have an initial variation with respect to thickness;

a first pair of rollers to make cuts on a surface of the raw protein-containing foodstuff portions, the first pair of rollers includes a first roller having cutting blades and a second roller having a non-cutting surface;

a second pair of rollers below the first pair of rollers, the second pair of rollers to press the raw protein-containing foodstuff portions, the second pair of rollers includes a third roller having a non-cutting surface and a fourth roller having a non-cutting surface; and a controller configured to adjust a first spacing between protrusions of the first and second rollers in 1 mm increments and to further adjust a second spacing between protrusions of the third and fourth rollers in 1 mm increments.

2. The macerator of claim 1, wherein the second, third, and fourth rollers have a same textured surface on an exterior of the rollers.

3. The macerator of claim 1, wherein a central axis of the first roller is parallel to a central axis of the second roller and the axes are at a same height from a reference.

4. The macerator of claim 1, wherein a central axis of the third roller is parallel to a central axis of the fourth roller and the axes are at a same height from a reference.

5. The macerator of claim 1, wherein the first roller includes a plurality of castellated cutting discs, wherein the castellated cutting discs are arranged concentrically with a central axis of the first roller and cutting sections of adjacent discs are separated axially.

6. The macerator of claim 5, wherein each castellated cutting disc includes multiple discrete arms extending radially outward which terminate in a radiused cutting edge, wherein a circular length of each cutting edge is equal to a spacing between any two cutting edges which are regularly spaced on the disc and adjacent castellated cutting discs are rotationally aligned such that a cutting edge is adjacent to the spacing between cutting edges on an adjacent castellated cutting disc and a number of arms of a castellated cutting disc is 20 to 30.

7. The macerator of claim 1, wherein the first roller includes a plurality of star cutting discs, wherein the star cutting discs are arranged concentrically with a central axis of the first roller and cutting sections of adjacent discs are separated axially.

8. The macerator of claim 7, wherein each star cutting disc includes multiple discrete arms extending radially outward which terminate in a radiused cutting edge, wherein a circular length of each cutting edge is half as long as a spacing between any two cutting edges which are regularly spaced on the disc and adjacent star cutting discs are rotationally aligned such that a cutting edge is adjacent to the spacing between cutting edges on an adjacent star cutting disc and a number of arms of a star cutting disc is 20 to 30.

9. The macerator of claim 1, wherein the first spacing and the second spacing are each from 3 mm to 15 mm.

10. A method for processing a protein-containing foodstuff portion to control at least the thickness comprising:

providing a macerator, including:

a conveyor for conveying raw protein-containing foodstuff portions, wherein the raw protein-containing foodstuff portions have an initial variation with respect to thickness;

a first pair of rollers to make cuts on a surface of the raw protein-containing foodstuff portions, the first pair of rollers includes a first roller having cutting blades and a second roller having a non-cutting surface;

a second pair of rollers below the first pair of rollers, the second pair of rollers to press the raw protein-containing foodstuff portions, the second pair of rollers includes a third roller having a non-cutting surface and a fourth roller having a non-cutting surface; and a controller configured to adjust a first spacing between protrusions of the first and second rollers in 1 mm increments and to further adjust a second spacing between protrusions of the third and fourth rollers in 1 mm increments;

cutting a raw protein-containing foodstuff portion to make cuts on a surface of the raw protein-containing foodstuff portion, the raw protein-containing foodstuff portion has a first initial thickness; and after the raw protein-containing foodstuff portion is cut, pressing the raw protein-containing foodstuff portion, wherein after pressing a thickness of the raw protein-containing foodstuff portion is reduced from the initial thickness.

11. A method for processing a protein-containing foodstuff portion to control the thickness, comprising:

providing a macerator, including:

a conveyor for conveying raw protein-containing foodstuff portions, wherein the raw protein-containing foodstuff portions have an initial variation with respect to thickness;

a first pair of rollers to make cuts on a surface of the raw protein-containing foodstuff portions, the first pair of rollers includes a first roller having cutting blades and a second roller having a non-cutting surface;

a second pair of rollers below the first pair of rollers, the second pair of rollers to press the raw protein-containing foodstuff portions, the second pair of rollers includes a third roller having a non-cutting surface and a fourth roller having a non-cutting surface; and a controller configured to adjust a first spacing between protrusions of the first and second rollers in 1 mm increments and to further adjust a second spacing between protrusions of the third and fourth rollers in 1 mm increments;

passing a raw protein-containing foodstuff portion between the first pair of rollers to make cuts on a surface of the raw protein-containing foodstuff portion; and after the raw protein-containing foodstuff portion passes from the first pair of rollers, passing the raw protein-containing foodstuff portion between the second pair of rollers to press the raw protein-containing foodstuff portion.

12. The method of claim 11, wherein the raw protein-containing foodstuff portion includes chicken meat.

13. The method of claim 11, wherein the raw protein-containing foodstuff portion is a boneless and skinless chicken breast.

14. The method of claim 11, wherein a spacing of the first roller to the second roller is less than a thickness of the raw protein-containing foodstuff portion, and a spacing of the third roller from the fourth roller is less than a thickness of the raw protein-containing foodstuff portion.

15. The method of claim 11, wherein the first roller includes a plurality of castellated cutting discs, wherein the castellated cutting discs are arranged concentrically with a central axis of the first roller and the cutting sections of adjacent discs are separated axially.

16. The method of claim 15, wherein each castellated cutting disc includes multiple discrete arms extending radially outward which terminate in a radiused cutting edge, wherein a circular length of each cutting edge is equal to a spacing between any two cutting edges which are regularly spaced on the disc and adjacent castellated cutting discs are rotationally aligned such that a cutting edge is adjacent to the spacing between cutting edges on an adjacent castellated cutting disc and a number of arms of a castellated cutting disc is 20 to 30.

17. The method of claim 11, wherein the first roller includes a plurality of star cutting discs, wherein the star cutting discs are arranged concentrically with a central axis of the first roller and the cutting sections of adjacent discs are separated axially.

18. The method of claim 17, wherein each star cutting disc includes multiple discrete arms extending radially outward which terminate in a radiused cutting edge, wherein a circular length of each cutting edge is half as long as a spacing between any two cutting edges which are regularly spaced on the disc and adjacent star cutting discs are rotationally aligned such that a cutting edge is adjacent to the spacing between cutting edges on an adjacent star cutting disc and a number of arms of a star cutting disc is 20 to 30.

19. The method of claim 11, wherein the second, third, and fourth rollers have similar textured surfaces.

20. The method of claim 11, wherein the second, third, and fourth rollers have a texture including a repeating, regular pattern of protrusions and depressions.

21. The method of claim 11, wherein the first pair of rollers is positioned above the second pair of rollers to transfer the raw protein-containing foodstuff portion from the first pair of rollers to the second pair of rollers by gravity.

22. The method of claim 11, further comprising cooking the raw protein-containing foodstuff portion after passing the second pair of rollers, and determining a thickness of the cooked protein-containing foodstuff portion has been reduced compared to a cooked protein-containing foodstuff portion that is not passed by the first pair of rollers and has been pressed.

23. The method of claim 11, further comprising selecting a thickness range of the raw protein-containing foodstuff portion before passing the raw protein-containing foodstuff portion through the first and second pairs of rollers, and determining that the raw protein-containing foodstuff portion is within the thickness range after passing through the first and second pairs of rollers.

* * * * *